US009330108B2

(12) United States Patent
Jones et al.

(10) Patent No.: US 9,330,108 B2
(45) Date of Patent: May 3, 2016

(54) MULTI-SITE HEAT MAP MANAGEMENT

(71) Applicant: International Business Machines Corporation, Armonk, NY (US)

(72) Inventors: Carl E. Jones, Tucson, AZ (US); John T. Olson, Tucson, AZ (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 14/041,358

(22) Filed: Sep. 30, 2013

(65) Prior Publication Data
US 2015/0095282 A1    Apr. 2, 2015

(51) Int. Cl.
*G06F 17/00* (2006.01)
*G06F 7/00* (2006.01)
*G06F 17/30* (2006.01)

(52) U.S. Cl.
CPC .................. *G06F 17/30212* (2013.01)

(58) Field of Classification Search
CPC ............................................... G06F 17/30174
USPC ........................................................ 707/624
See application file for complete search history.

(56) References Cited

U.S. PATENT DOCUMENTS

| | | | |
|---|---|---|---|
| 7,035,880 B1 | 4/2006 | Crescenti et al. | |
| 8,924,359 B1 * | 12/2014 | Pendharkar | G06F 3/06 707/661 |
| 2005/0021869 A1 | 1/2005 | Aultman et al. | |
| 2008/0098003 A1 * | 4/2008 | Dias | G06F 17/30306 707/999.01 |
| 2008/0228835 A1 * | 9/2008 | Lashley et al. | 707/202 |
| 2009/0031097 A1 * | 1/2009 | Nelson | G06F 11/1435 711/162 |
| 2009/0281861 A1 * | 11/2009 | Miller | G06Q 10/06 709/201 |
| 2011/0106863 A1 * | 5/2011 | Mamidi | G06F 17/30221 707/823 |
| 2011/0125894 A1 * | 5/2011 | Anderson | H04L 9/3213 709/224 |
| 2011/0264843 A1 * | 10/2011 | Haines et al. | 711/103 |
| 2012/0110259 A1 | 5/2012 | Mills et al. | |
| 2012/0124282 A1 | 5/2012 | Frank et al. | |

(Continued)

FOREIGN PATENT DOCUMENTS

| | | |
|---|---|---|
| WO | 9927451 A1 | 6/1999 |
| WO | 2010087803 A1 | 8/2010 |
| WO | 2012170751 A2 | 12/2012 |

OTHER PUBLICATIONS

Dufrasne, "IBM System Storage DS8000 Easy Tier Heat Map Transfer", First Edition (Aug. 2013) pp. 1-45, This document was created on Aug. 14, 2013, Copyright International Business Machines Corporation 2013, <www.redbooks.ibm.com/redpapers/pdfs/redp5015.pdf>.
Fuentes, et al., "Using the Storage Tier Advisor Tool (STAT) and Easy Tier™ on the IBM Storwize V7000", IBM, Feb. 3, 2011, Copyright IBM Corporation, 2011, pp. 1-19.
Shetty, Mayur, "Performance benefits of IBM Storwize V7000 with Easy Tier for Oracle 11g workload", IBM Systems and Technology Group ISV Enablement, Jan. 2011, pp. 1-43.

(Continued)

*Primary Examiner* — Pavan Mamillapalli
(74) *Attorney, Agent, or Firm* — Adolph Bohnstedt; David M. Quinn

(57) ABSTRACT

A first server system identifies a first storage area of the first server system, the first storage area being associated with a first heat value and storing at least a portion of a file. The first server system determines an identifier corresponding to the portion of the file. The first server system associates the portion of the file with the first heat value. The first server system sends the identifier corresponding to the portion of the file and the associated heat value to a second server system, wherein the second server system includes a duplicate copy of the portion of the file.

20 Claims, 4 Drawing Sheets

(56) References Cited

U.S. PATENT DOCUMENTS

| | | |
|---|---|---|
| 2012/0159329 A1 | 6/2012 | Chow et al. |
| 2012/0260055 A1 | 10/2012 | Murase |
| 2012/0323821 A1 | 12/2012 | Crk et al. |
| 2013/0018852 A1 | 1/2013 | Barton et al. |
| 2015/0006787 A1* | 1/2015 | Liu et al. .................. 711/103 |

OTHER PUBLICATIONS

Spagnolo, Paul, "DS8000 Easy Tier and Storage Tier Advisor Tool Demo", IBM, Copyright 2012 IBM Corporation, Advanced Technical Skills (ATS) North America, pp. 1-58.

"EMC Symmetrix Storage Management Solution", EMC Corporation, Copyright 2010 EMC Corporation.

* cited by examiner

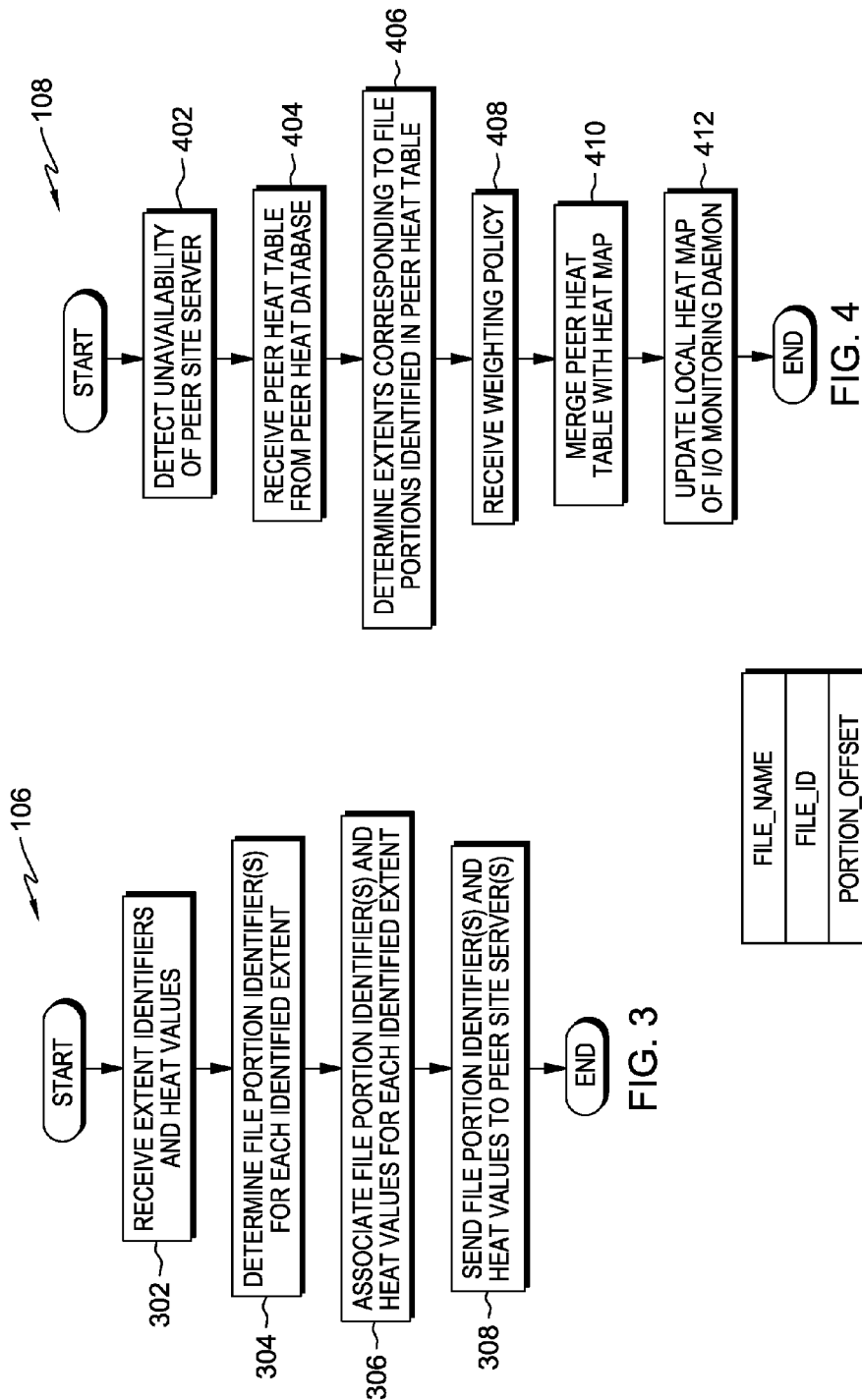

MULTI-SITE HEAT MAP MANAGEMENT

BACKGROUND

The present invention relates generally to the field of data storage systems, and more particularly to multi-site heat map management.

As data storage demands have increased, various distributed data storage models have emerged, including networked data storage environments where data is stored on an interconnected network of storage systems. Such an environment may include storage systems located at different data sites. A data site may serve as a backup for a main data site to protect against failure of the main data site, in which case only one of the data sites serves data to client devices at a time. Panache is a protocol for a multi-site server configuration wherein a main data site (also called a home data site) stores primary file data and a cache data site maintains cached file data by replicating and storing the primary file data. Both the home data site and the cache data site may simultaneously serve data to clients. In such a case, each client application can access the stored data from the home site or the cache site and may access the site with the lowest latency or the site which is geographically closest.

Multi-tiered storage is a storage method in which data is stored on various types of storage media based on workload activity metrics stored as heat values in a heat map. A workload activity metric may be calculated for contiguous areas of storage in a computer file system in a logical volume, such as extents. The heat value may be a number on a scale and may be expressed as a temperature gradient from hot (high activity) to cold (low activity). Storing hot data on a fast storage tier and colder data on a slow storage tier improves overall performance of the storage system. The fast storage tier may comprise storage media with lower file access times than the slow storage tier. For example, the fast storage tier may comprise a plurality of solid-state drives while the slow storage tier comprises a plurality of hard disk drives. The heat map associates extents with heat values. As metrics are tracked over time, the heat map is adjusted and the data may be relocated among the storage tiers appropriately. Multi-tier data sites serving data to clients may each have a heat map based upon the workload activity of each respective data site.

SUMMARY

Embodiments of the present invention disclose a method, computer program product, and system for updating access values in a replicated server system. A first server system identifies a first storage area of the first server system, the first storage area being associated with a first heat value and storing at least a portion of a file. The first server system determines an identifier corresponding to the portion of the file. The first server system associates the portion of the file with the first heat value. The first server system sends the identifier corresponding to the portion of the file and the associated heat value to a second server system, wherein the second server system includes a duplicate copy of the portion of the file.

BRIEF DESCRIPTION OF THE SEVERAL VIEWS OF THE DRAWINGS

FIG. 3 depicts operations of a transfer program, operating on a site server, in accordance with an embodiment of the present invention.

FIG. 4 depicts operations of a restore program, operating on a site server, in accordance with an embodiment of the present invention.

FIG. 5 depicts a format of a peer heat table, in accordance with an embodiment of the present invention.

DETAILED DESCRIPTION

Figure 1:
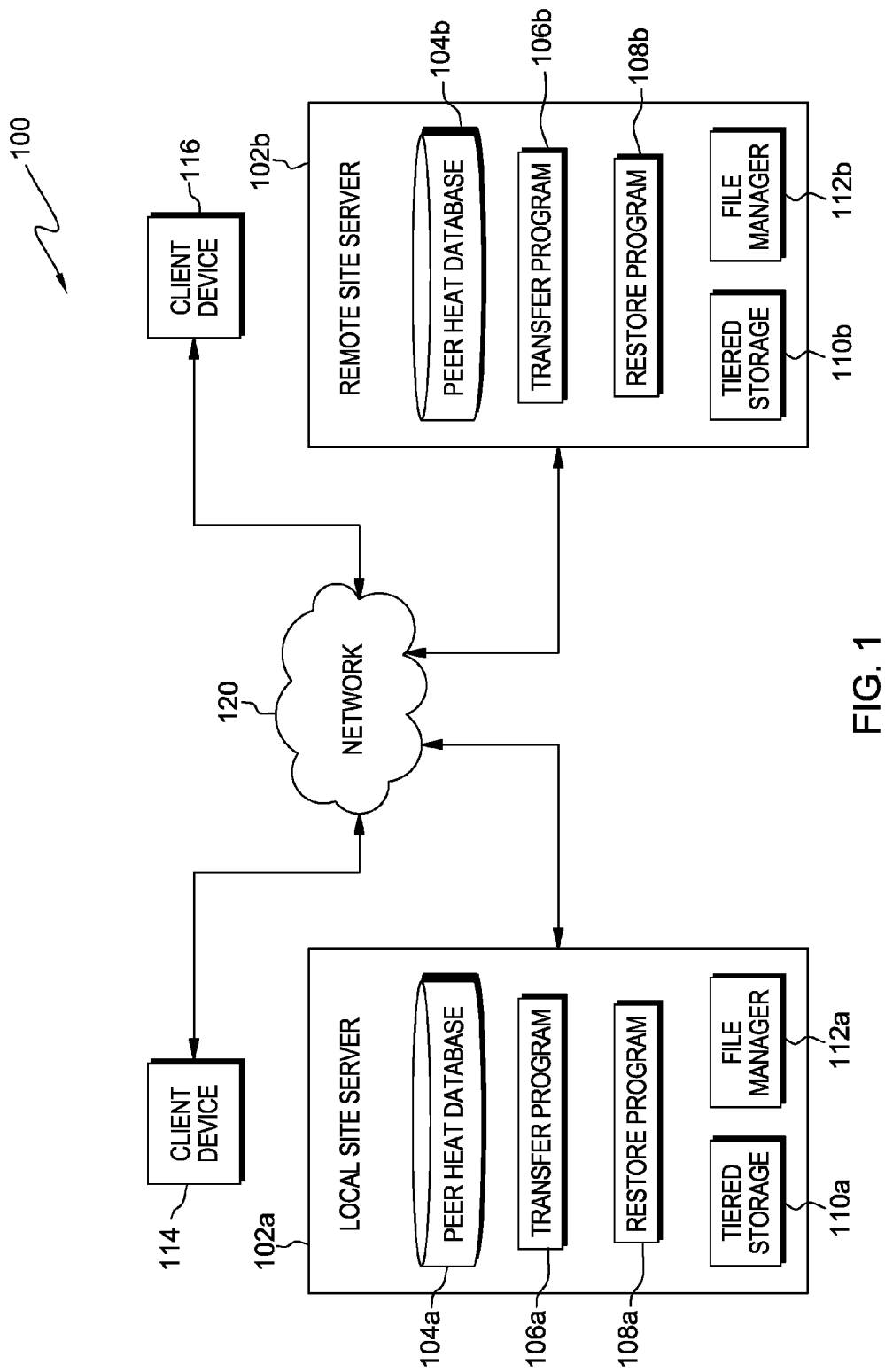
FIG. 1 is a functional block diagram illustrating a distributed data storage environment, in accordance with an embodiment of the present invention.

Embodiments of the present invention recognize that the geographical distance between a client device and a server introduces network latency, thereby increasing effective file access times when the client device accesses data that the server hosts. Storing the data at a site closer to the client device can reduce network latency, thereby decreasing file access times. Data can be stored redundantly at multiple sites, which may be configured so that each of the multiple sites actively serves data. For example, the sites may employ Panache, which is a file system caching layer integrated with the file system of each server. In such an example, some applications may access one data site and other applications may access another data site (e.g., based on geographic proximity).

Embodiments of the present invention further recognize that each server of a data site may store data using multiple tiers of storage, which may include a fast tier and a slow tier. For example, frequently accessed data may be stored on a fast tier and infrequently accessed data may be stored on a slow tier, in which case the frequency of access is stored in a heat map. The heat map from one site may be different from the heat map of another site due to differences in file access statistics of the respective client devices.

Further recognized is that, when a first data site fails, the client devices accessing the first data site may instead access a second data site hosting the same data as the first data site. However, the heat map of the second data site does not reflect the file access statistics of the client devices which were accessing the first data site, and therefore inefficiencies can be introduced as a client device switches from one data site to another.

Embodiments of the present invention provide improved file access times for client applications by improved heat map management. Specifically, various embodiments of the present invention may include transferring file access statistics from a first data site to a second data site. Additionally, embodiments of the present invention may merge file access statistics of an unavailable data site into a heat map of another data site. When a first data site becomes unavailable (or a transfer of service is otherwise indicated), a client device which was accessing the first data site instead accesses a second data site. The second data site determines that the first data site is unavailable and may merge the file access statistics of the first data site with the heat map of the second data site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with, an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data storage environment, generally designated 100, in accordance with one embodiment of the present invention.

Distributed data storage environment 100 includes local site server 102a and remote site server 102b, each of which may be referred to individually and generically as "peer site server 102." In various embodiments, distributed data storage environment 100 may comprise a greater or fewer number of peer site servers 102 than the two depicted in FIG. 1. Distributed data storage environment 100 also includes client devices 114 and 116. In various embodiments, distributed data storage environment 100 may comprise a greater or fewer number of client devices 114 and 116 than the two depicted in FIG. 1. Peer site servers 102 and client devices 114 and 116 are all interconnected over network 120.

Each respective instance of peer site server 102 includes an instance of peer heat database 104 (e.g., peer heat database 104a on local site server 102a and peer heat database 104b on remote site server 102b), an instance of transfer program 106 (e.g., transfer program 106a on local site server 102a and transfer program 106b on remote site server 102b), an instance of restore program 108 (e.g., restore program 108a on local site server 102a and restore program 108b on remote site server 102b), an instance of tiered storage 110 (e.g., tiered storage 110a on local site server 102a and tiered storage 110b on remote site server 102b), and an instance of file manager 112 (e.g., file manager 112a on local site server 102a and file manager 112b on local site server 102b).

Each peer site server 102 hosts data for network access by, for example, client devices 114 and 116. In one embodiment, each peer site server 102 is in communication with each other peer site server 102 via network 120.

In an illustrative embodiment, data hosted by a first and a second peer site server includes at least one file. In this illustrative embodiment, each peer site server stores the file differently relative to one another, for example at different physical storage addresses, across a different number of extents, in a different number of file portions, or in file portions of different sizes. Transfer program 106 of the first peer site server may associate a file portion identifier of a file portion stored on the first peer site server with the heat value of the extent of the first peer site server in which the file portion resides. Transfer program 106 may send the file portion identifier and associated heat value to the second peer site server. Restore program 108 of the second peer site server may determine one or more extents of the second peer site server in which the file portion resides and may merge the heat values of the first and second peer site servers corresponding to the file portion, thereby promoting efficient access of the second peer site server by client devices of both the first and second peer site servers.

In an embodiment, peer heat database 104 stores at least one peer heat table, each peer heat table corresponding to a peer site server 102 other than the peer site server 102 on which peer heat database 104 resides. For example, peer heat database 104*a* on local site server 102*a* may store a peer heat table corresponding to activity on remote site server 102*b*. Each peer site server 102 may store a peer heat table (or modify a previously stored peer heat table) in peer heat database 104 in response to receiving file portion identifiers and associated heat values from another peer site server 102. In one embodiment, a peer site server periodically updates other peer site servers with relevant peer heat table data. Peer heat database 104 is discussed in more detail in connection with FIG. 3. The peer heat table is discussed more in connection with FIG. 5.

In one embodiment, transfer program 106 transfers a peer heat table from a first peer site server 102 to a second peer site server 102. Consistently updating a peer site server with heat values (e.g., client access indicators) allows for a client device utilizing the first peer site server to transfer to the second peer site server and continue to access data in an efficient manner. An exemplary implementation of transfer program 106 is discussed more in connection with FIG. 3.

In an embodiment, a peer site server 102 executes transfer program 106 from time to time. For example, local site server 102*a* may execute transfer program 106*a*, thereby transferring one or more file portion identifiers and associated heat values of local site server 102*a* to another peer site server 102 (e.g., remote site server 102*b*), which updates the peer heat table corresponding to local site server 102*a*. In various embodiments, a peer site server 102 may execute transfer program 106 periodically or in response to detecting a change in the heat map of the peer site server 102. In an embodiment, the heat map of peer site server 102 resides in an I/O monitoring daemon of a tiered storage, which is discussed more in connection with FIG. 2.

Restore program 108 operates to merge a peer heat table corresponding to a second peer site server with a heat map of the peer site server on which the restore program resides. Peer site server 102 executes restore program 108 in response to determining that the second peer site server is unavailable. In this fashion, the peer site server may relocate data between or among a plurality of storage tiers to promote efficient access. Restore program 108 is discussed more in connection with FIG. 4.

In one embodiment, tiered storage 110 comprises an input/output (I/O) monitoring daemon, a plurality of storage tiers, and a data relocator. The data relocator relocates data between or among the plurality of storage tiers in response to workload activity monitored by the I/O monitoring daemon to promote efficient access. Tiered storage 110 is discussed more in connection with FIG. 2.

As mentioned previously, each peer site server may also include file manager 112. File manager 112 comprises a file table. In an embodiment, the file table comprises storage space allocations corresponding to one or more file portions of one or more files. In an embodiment, one or more file portions may be stored in an extent of tiered storage 110. An extent may contain all or part of one or more files. It is understood that the present invention may be implemented using other units of contiguous areas of storage in a computer file system, such as segments, blocks, or clusters. Thus, extents are described in connection with the present invention as an example of a storage area. File manager 112 of peer site server 102 communicates with one or more other peer site servers 102 via network 120 to exchange hosted data and control information.

Network 120 may be, for example, a local area network (LAN), a wide area network (WAN) such as the Internet, or a combination of the two, and may include wired, wireless, or fiber optic connections. In general, network 120 may be any combination of connections and protocols that will support communications between peer site servers 102 and client devices 114 and 116.

In an illustrative example, client device 114 accesses data stored in tiered storage 110*a* of local site server 102*a* and client device 116 accesses data stored in tiered storage 110*b* of remote site server 102*b*. Tiered storage 110*a* monitors file access statistics based on access by client device 114 to determine a heat map. Transfer program 106*a* sends at least one identifier of a file portion stored in tiered storage 110*a* and an associated heat value to remote site server 102*b*, which is stored in peer heat database 104*b* in a peer heat table corresponding to local site server 102*a*. Tiered storage 110*b* monitors file access statistics based on access by client device 116 to determine a heat map. Transfer program 106*b* sends at least one identifier of a file portion stored in tiered storage 110*b* and an associated heat value to local site server 102*a*, which peer heat database 104*a* stores in a peer heat table corresponding to local site server 102*b*. If local site server 102*a* later becomes unavailable, client device 114 begins to access remote site server 102*b* instead of local site server 102*a*. In response to restore program 108*b* determining the unavailability of local site server 102*a*, restore program 108*b* merges the peer heat table corresponding to local site server 102*a* (and stored in peer heat database 104*b*) with the heat map of tiered storage 110*b* using file information from file manager 112*b*. Restore program 108*b* sends the merged heat map to tiered storage 110*b*. Tiered storage 110*b* relocates data stored in a plurality of tiers based on the merged heat map.

In some embodiments, peer site server 102 utilizes blocks rather than extents. For example, tiered storage 110 may store, monitor, and relocate block rather than extents, and file manager 112 may identify one or more blocks corresponding to a file. In this case, transfer program 106 may receive a list of blocks and determine at least one file portion identifier for each and restore program 108 may determine blocks corresponding to file portions of a peer heat table and merge the peer heat table with the heat map. Similarly, it is understood that peer site server 102 may utilize any other unit of contiguous storage areas. Further, different peer site servers 102 may utilize different units of contiguous storage areas.

In some embodiments, peer site server 102 communicates with one or more other peer site servers 102 via one or more communication channels of network 120. A communication channel is a stream of input and output communicatively linking two peer site servers 102. For example, peer site servers 102 may communicate hosted data through a main channel and control data through a control channel.

In some embodiments, local site server 102*a* resides at a home site and remote site server 102*b* resides at a cache site. In such embodiments, the home site is the primary location of the hosted data and the cache site stores cached copies. Client devices may simultaneously access the hosted data from both the home site and the cache site. Thus, local site server 102*a* and remote site server 102*b* may both actively serve data to client devices 114 and 116. For example, client device 114 may access hosted data from local site server 102*a* and client device 116 may access hosted data from remote site server 102*b*. In some embodiments, each of client devices 114 and 116 accesses whichever peer site server 102 has the lowest latency or the closest geographical location.

In some embodiments, file manager 112 enforces a relationship between peer site servers 102 according to a protocol. For example, peer site servers 102 may follow the Panache protocol, in which case local site server 102*a* may be a home site server and remote site server 102*b* may be a cache site server. File manager 112*b* of remote site server 102*b* communicates via network 120 with file manager 112*a* of local site server 102*a* to request a file stored in tiered storage 110*a*. The home site server stores primary data in tiered storage 110*a* and the cache site server maintains cached file data by replicating the primary data and storing the cached file data in tiered storage 110*b*.

In various embodiments of the present invention, client devices 114 and 116 can each respectively be a laptop computer, a tablet computer, a netbook computer, a personal computer (PC), a desktop computer, a personal digital assistant (PDA), a smart phone, or any programmable electronic device capable of communicating with peer site servers 102 via network 120. Client devices 114 and 116 may include an operating system and one or more applications capable of communicating via network 120 using one or more distributed file system protocols.

In various embodiments of the present invention, each peer site server 102 may be a laptop computer, a tablet computer, a netbook computer, a personal computer (PC), a desktop computer, an enterprise server, a personal digital assistant (PDA), a smart phone, or any programmable electronic device capable of communicating with other peer site servers 102 and client devices 114 and 116 via network 120. In an embodiment, each peer site server 102 comprises a plurality of server computers, such as an enterprise grid of server computers operating in conjunction with one another. Each peer site server 102 may include internal and external hardware components, as depicted and described in further detail with respect to FIG. 6.

Figure 2:
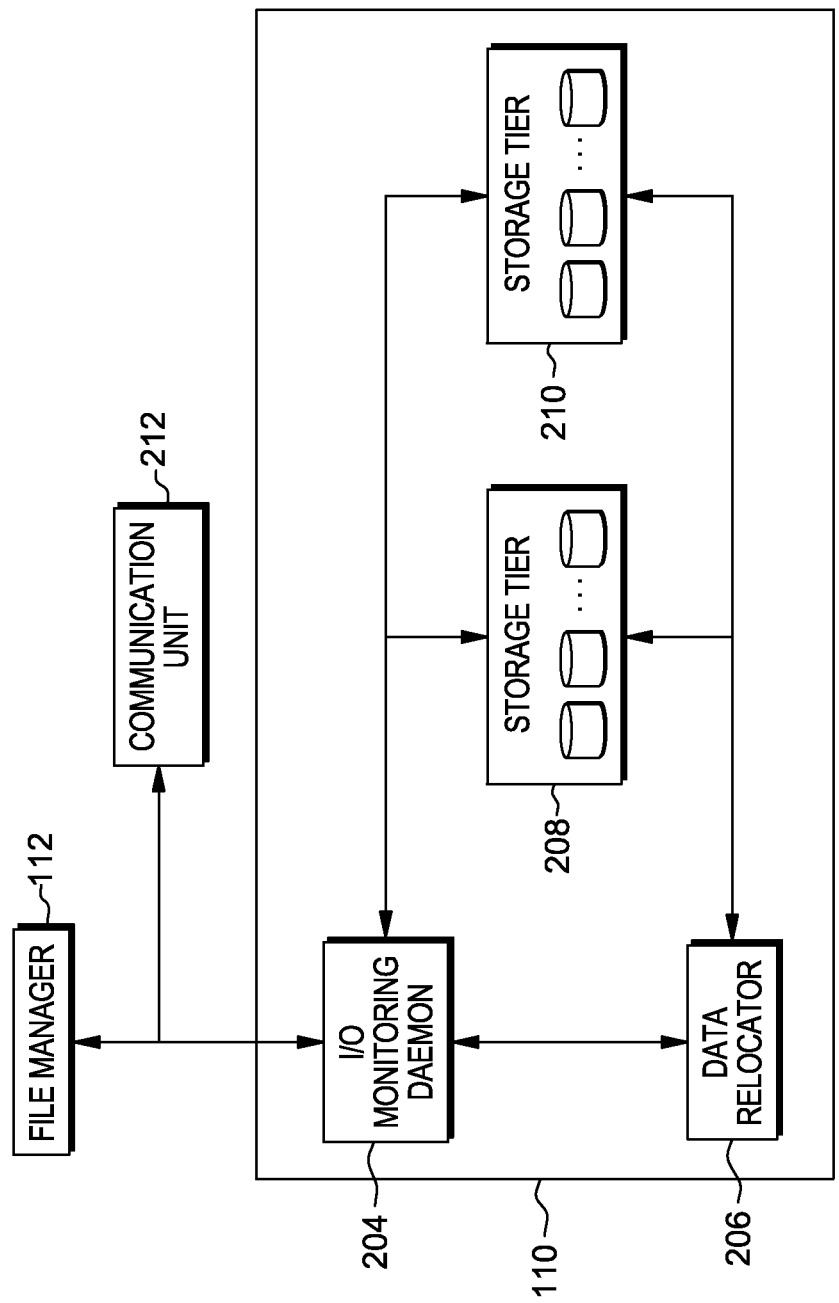
FIG. 2 is a functional block diagram illustrating a multi-tier data storage system, in accordance with an embodiment of the present invention.

FIG. 2 is a functional block diagram illustrating tiered storage 110, in accordance with an embodiment of the present invention.

Tiered storage 110 comprises I/O monitoring daemon 204, data relocator 206, and storage tiers 208 and 210. In some embodiments, tiered storage 110 may comprise a greater number of storage tiers than depicted in FIG. 2.

Storage tiers 208 and 210 each comprise a plurality of storage media. The storage media may be tape drives, hard disk drives (HDDs), solid-state drives (SSDs), or any other computer-readable storage media suitable for storage and accessing computer-readable data. Each of storage tiers 208 and 210 may comprise a different type or speed of storage media, or storage media with different characteristics. For example, storage tiers 208 and 210 may comprise a fast storage tier, comprising a plurality of SSDs, and a slow storage tier, comprising a plurality of HDDs.

Communications unit 212, in the depicted embodiment, provides for communications with other data processing systems or devices, including other peer site servers 102 and client devices 114 and 116 via, for example, network 120. Communications unit 212 may include one or more network interface cards. Communications unit 212 may provide communications through the use of either or both physical and wireless communications links. In the depicted embodiment, communications unit 212, file manager 112, and I/O monitoring 204 are in communication with one another.

I/O monitoring daemon 204 includes a heat map of peer site server 102. In an embodiment, the heat map identifies one or more extents of storage tiers 208 and 210 and the heat map further identifies a heat value corresponding to each extent. The heat value may, for example, be a measure of access frequency for an extent.

I/O monitoring daemon 204 monitors workload activity metrics of the data stored in storage tiers 208 and 210. In an embodiment, I/O monitoring daemon 204 monitors workload activity metrics for each extent of the data stored in storage tiers 208 and 210. Workload activity metrics may include, for example, access frequency and/or access duration corresponding to a file and/or storage area (e.g., an extent). I/O monitoring daemon 204 determines the heat value for an extent based on the workload activity metrics corresponding to the extent. I/O monitoring daemon 204 stores the I/O statistics in a heat map. The heat map identifies extents and corresponding heat values.

Data relocator 206 moves extents between storage tiers 208 and 210 based on the heat value for the extents contained in the heat map. In an embodiment, data relocator 206 moves hot extents to a fast tier and cold extents to a slow tier. For example, data relocator 206 may move hot extents to a fast tier of storage tiers 208 and 210 and cold extents to a slow storage tier of storage tiers 208 and 210.

File manager 112 comprises a file table identifying one or more extents of storage tiers 208 and 210 in which a file is stored. In some embodiments, the file table is an inode table comprising one or more inodes, wherein each inode comprises file information for a file. Generally, an inode is a data structure which stores file information.

File manager 112 communicates with other file managers 112 of other peer site servers 102. In an embodiment, each file manager 112 of each peer site server 102 communicates with each file manager 112 of each other peer site server 102 to synchronize the data stored in storage tiers 208 and 210. For example, each file manager 112 of each peer site server 102 may enforce the Panache protocol to store primary file data on a first peer site server and maintain cached file data on a second peer site server. The file manager of second peer site server (i.e., the cache site) replicates the primary file data. Each of the first and second peer site servers maintains a heat map responsive to the respective workload activity and relocates data among tiers of tiered storage responsive to the heat map. Thus, each peer site server may store the same file data in different storage areas (e.g., extents).

In some embodiments, I/O monitoring daemon 204 may track the frequency of access of data or other workload activity and, in response to a change in that frequency, I/O monitoring daemon 204 may update the heat map.

In some embodiments, data relocator 206 copies hot data from a slow tier to a fast tier without deleting the hot data from the slow tier. In this case, the copy of the hot data on the slow tier is accessed only if the copy on the fast tier is deleted.

In some embodiments, tiered storage 110 may generally refer to a collection of components of peer storage site 102. In other embodiments, tiered storage 110 may reside physically apart from peer storage site 102, in which case tiered storage 110 and peer storage site 102 are in communication with one another. For example, tiered storage 110 may comprise a bank of storage servers working in conjunction. In some embodiments, each tier of tiered storage 110 is physically separate from the remainder of tiered storage 110, in which case each tier is in communication with I/O monitoring daemon 204 and data relocator 206.

In some embodiments, file manager 112 may enforce file permissions for the data stored in storage tiers 208 and 210. For example, a first file manager 112 of a first peer site server 102 may allow read and write operations on data stored in storage tiers 208 and 210 of the first peer site server 102, while a second file manager 112 of a second peer site server 102 allows only read operations on storage tiers 208 and 210 of the second peer site server 102.

In some embodiments, I/O monitoring daemon 204, data relocator 206, storage tiers 208 and 210, and file manager 112 utilize blocks rather than extents. For example, I/O monitoring daemon 204 may monitor the I/O statistics of blocks. The heat map may identify blocks. Data relocator 206 may relocate blocks. File manager 112 may identify one or more blocks in which a file is stored. Similarly, it is understood that any other unit of data could be utilized throughout peer site server 102. Further, different peer site servers 102 may utilize different units of data.

In some embodiments, a heat value is expressed on a scale, for example on a scale of zero to nine. In some embodiments, a certain percentage of the data stored on storage tiers 208 and 210 is considered hot. For example, the percentage of data stored on storage tiers 208 and 210 which is considered hot may be the storage capacity of a fast tier divided by the sum of the storage capacity of all storage tiers 208 and 210.

FIG. 3 is a flowchart of the operations of transfer program 106, in accordance with an embodiment of the present invention.

Transfer program 106 receives a list of one or more extent identifiers and corresponding heat values for each (302). In an embodiment, transfer program 106 receives the list of one or more extent identifiers and corresponding heat values for each from I/O monitoring daemon 204. Each extent identifier identifies an extent of storage tiers 208 and 210. In another embodiment, transfer program 106 receives the extent identifiers and corresponding heat values as a heat map from I/O monitoring daemon 204. For example, transfer program 106a of local site server 102a may receive a heat map from I/O monitoring daemon 204a of local site server 102a, the heat map identifying one or more extents of storage tiers 208 and 210 of local site server 102a, and each extent's corresponding heat value.

Transfer program 106 determines at least one file portion identifier for each identified extent (304). In an embodiment, each file portion identifier correlates a file name, a remote file identifier, a file offset, and a portion length. An extent may store one or more file portions. Thus, transfer program 106 may determine one or more file portion identifiers for an extent, each file portion identifier corresponding to a file portion stored in the extent.

In an embodiment, transfer program 106 of a peer site server 102 queries file manager 112 of the peer site server 102 to determine the file name, the file offset, and/or the portion length of the file portion identifier. In this embodiment, transfer program 106 of the peer site server 102 may query I/O monitoring daemon 204 of the peer site server 102 to determine the heat value.

In an embodiment, transfer program 106 of the peer site server 102 queries file manager 112 of another peer site server 102 to determine the remote file identifier. For example, transfer program 106a may query file manager 112b to determine a remote file identifier corresponding to a file stored, in part, in an extent of tiered storage 110a. The query of transfer program 106 to file manager 112 may include the file name of the file.

Transfer program 106 associates the file portion identifiers with the heat value corresponding to each identified extent (306). Each file portion identifier corresponds to a file portion stored in an identified extent. Transfer program 106 may determine a file portion identifier for each file portion within an identified extent (or other storage unit). The composition of a file portion identifier is discussed with greater detail in connection with FIG. 5. Transfer program 106 associates each file portion identifier with the heat value corresponding to the extent in which the file portion resides.

Transfer program 106 sends the file portion identifiers and heat values to one or more other peer site servers 102 (308). In an embodiment, transfer program 106 sends the file portion identifiers and associated heat values to every other peer site server 102 of distributed data environment 100. In an embodiment, transfer program 106 sends all file portion identifiers and associated heat values of the peer heat table of the peer site server executing transfer program 106 to one or more other peer site servers 102. Peer site server 102, in response to receiving file portion identifiers and associated heat values, updates the peer heat table of peer heat database 104 corresponding to the peer site server from which the file portion identifiers and associated heat values were received.

As an illustrative embodiment, remote site server 102b may execute transfer program 106b. Transfer program 106b receives a list identifying an extent and a heat value of the extent. In this example, the extent stores a plurality of file portions. Transfer program 106b determines file portion identifiers for each file portion of the extent by querying file manager 112b for the file name, offset, and length corresponding to a file of which file portion is a portion and querying file manager 112a for a file identifier of the file. Transfer program 106b associates each file portion identifier with a heat value corresponding to the heat value of the extent. Transfer program 106b sends the file portion identifiers and associated heat values to local site server 102b.

In some embodiments, transfer program 106 receives one or more extent identifiers and corresponding heat values in response to I/O monitoring daemon 204 updating or changing the heat map. For example, transfer program 106 may receive an extent identifier and heat value for an extent in response to I/O monitoring daemon 204 changing the heat value associated with the extent in the heat map.

In some embodiments, transfer program 106 receives extent identifiers and corresponding heat values for all those extents whose heat values I/O monitoring daemon 204 changed since the last execution of transfer program 106.

FIG. 4 depicts operations of restore program 108, operating on peer site server 102, in accordance with an embodiment of the present invention.

Restore program 108 detects the unavailability of another peer site server 102 (402). For example, restore program 108b of remote site server 102b may detect the unavailability of local site server 102a. In an embodiment, restore program 108 detects the unavailability of another peer site server 102 in response to restore program 108 failing to receive a response to a signal to the other peer site server 102 within a time frame. For example, remote site server 102b may determine whether local site server 102a is unavailable based upon whether local site server 102a responds within a maximum amount of time to a message or request from remote site server 102b. The message or request may be routine to file replication or other operations or may be a reachability test message. If local site server 102*a* fails to timely respond, restore program 108 of remote site server 102*b* may determine that local site server 102*a* is unavailable. Peer site server 102 may be unavailable due to a malfunction, routine maintenance, etc. In an embodiment, a first peer site server determines that a second peer site server is unavailable by determining that one or more clients of the second peer site server are accessing data hosted by the first peer site server.

Restore program 108 receives a peer heat table from peer heat database 104 (404). In an embodiment, the peer heat table identifies at least one file portion and a corresponding heat value. In an embodiment, the peer heat table comprises file names, file identifiers, file offsets, portion lengths, and heat values, each of which peer site server 102 received and stored in peer heat database 104 in response to another peer site server 102 executing transfer program 106. For example, restore program 108*b* of remote site server 102*b* may receive the peer heat table stored in peer heat database 104*b*, which peer heat database 104*b* stored in response to local site server 102*a* executing transfer program 108*a*.

Restore program 108 determines extents corresponding to file portions identified by the peer heat table (406). As stated earlier, a file portion may reside at a different physical storage address or in a different number of extents in different peer site servers 102. By determining extents corresponding to file portions of the peer heat table, restore program 108 can determine the extents in which the file portion resides on the peer site server 102 which is executing restore program 108. In an embodiment, restore program 108 queries file manager 112 with a file identifier of the peer heat table, the file identifier identifying a file, and receives from file manager 112 one or more extent identifiers, each identifying an extent of tiered storage 110 in which the file is stored.

Restore program 108 receives a weighting policy (408). The weighting policy may be received as user input from a user or system administrator. In an embodiment, the weighting policy prioritizes the peer heat table and the heat map relative to one another. Restore program 108 may, by way of the weighting policy, promote efficient access to hosted data by the client devices of each peer site server in a balanced fashion. The weighting policy may include, for example, a heat modifier and/or a storage quota.

In an embodiment, the weighting policy includes a storage quota (e.g., an amount in bytes or a percentage) of a storage tier to allocate to hot data identified by the peer heat table. For example, restore program 108*a* may receive a weighting policy identifying twenty-five percent of a fast tier of tiered storage 110 as user input from a system administrator in order to allocate a portion of the fast tier for storing hot extents identified by a peer heat table corresponding to an unavailable peer site server.

In another embodiment, the weighting policy includes a heat modifier, which is a value by which restore program 108 modifies heat values of the peer heat table. In a simple example, restore program 108 may receive a weighting policy including a heat modifier of 0.7, in which case restore program 108 may multiply each heat value of the peer heat table by 0.7 to determine a weighted heat value. Restore program 108 may receive a weighting policy which reduces the heat values of the peer heat table (e.g., a heat multiplier less than 1.0), thereby reducing the priority of the peer heat table relative to the heat map.

Restore program 108 merges the peer heat table with the heat map (410). The heat map is the heat map of the server executing restore program 108. In an embodiment, restore program 108 may merge the heat values of the peer heat table with the heat values of the local heat map. For example, restore program 108 may identify a heat value of the peer heat table determined to correspond to an extent and a heat value of the heat map corresponding to the extent. Restore program 108 may calculate a merged heat value corresponding to the extent, for example by calculating an average of the identified heat values or by selecting the greater of the identified heat values. In calculating the merged heat value, restore program 108 may apply a weighting policy, for example by multiplying the identified heat value of the peer heat table by a heat modifier. In an embodiment, restore program 108 stores the merged heat value corresponding to an extent as the heat value of the heat map corresponding to the extent. In an alternate embodiment, restore program 108 stores the merged heat value in a merged heat table and associates the merged heat value with the extent by the merged heat table.

Restore program 108 updates the heat map of I/O monitoring daemon 204 (412). In an embodiment, restore program 108 updates the heat map after merging all entries of the peer heat table with the heat map. In an alternative embodiment, restore program 108 updates the heat map in response to merging at least one entry of the peer heat table with the heat map. For example, restore program 108 may update the heat map in response to merging each heat value of the heat map with the corresponding heat value of the peer heat table.

In some embodiments, restore program 108 sorts the peer heat table prior to determining extents corresponding to file portions identified in the peer heat table. For example, the peer heat table may comprise a time of entry corresponding to each file. In various embodiments, the time of entry may be the time at which peer heat database 104 stored the entry or the time at which peer heat database 104 last updated the entry. In some embodiments, restore program 108 may sort the peer heat table prior to merging the peer heat table and heat map. For example, restore program 108 may sort the peer heat table by time of entry in order to process the newest entries of the peer heat table first. Alternatively, restore program 108 may sort the peer heat table by heat value in order to process the hottest entries of the peer heat table first. In an illustrative embodiment, restore program 108 sorts the peer heat table by heat value in descending order and ceases processing further heat values when the heat value being processed falls below a threshold value, thereby giving no weight to extents of the peer heat table which are cold.

In some embodiments, restore program 108 receives the heat map from I/O monitoring daemon 204 prior to merging the peer heat table with the heat map. For example, restore program 108 may create a copy of the heat map in storage (e.g., persistent storage 608 of FIG. 6) or in memory (e.g., memory 606 of FIG. 6).

In some embodiments, subsequent to restore program 108 of a first peer site server 102 determining that a second peer site server 102 is unavailable (see 402 and related discussion), restore program 108 may determine that the second peer server 102 is no longer unavailable. For example, remote site server 102*b* may determine whether local site server 102*a* is unavailable based upon whether local site server 102*a* responds within a maximum amount of time to a message or request from remote site server 102*b*. The message or request may be routine to file replication or other operations or may be a reachability test message. If local site server 102*a* does not fail to timely respond, restore program 108 of remote site server 102*b* may determine that local site server 102*a* is available (i.e., no longer unavailable). In an embodiment, a first peer site server may determine that a second peer site server is no longer unavailable by determining that one or more clients of the second peer site server are no longer accessing data hosted by the first peer site server or have resumed accessing data from the second peer site server rather than the first peer site server. In an embodiment, restore program 108 may reinstate the heat map of the first peer site server 102 to the state it was in prior to updating the heat map of the I/O monitoring daemon 204. For example, restore program 108 merging the peer heat table with the heat map (see 410 and related discussion) may include storing a backup copy of the heat map and, in response to determining that the peer site server 102 is no longer unavailable, restore program 108 may update the heat map of the I/O monitoring daemon 204 with the backup copy of the heat map. In another embodiment, restore program 108 may re-initialize the heat map of I/O monitoring daemon 204 with a blank heat map. In yet another embodiment, I/O monitoring daemon 204 may continue to monitor workload activity and update the heat map.

FIG. 5 depicts a format of a file portion identifier stored in a peer heat table. The peer heat table may reside in peer heat database 104. Each peer heat table of peer site server 102 corresponds to another peer site server 102. For example, a peer heat table stored in peer heat database 104*b* may correspond to local site server 102*a*. In an embodiment, the peer heat table comprises one or more file portion identifiers, each file portion identifier corresponding to a file portion stored in an extent of tiered storage 110. Each file portion identifier may comprise a plurality of correlated values. The file portion identifier may include fewer values than depicted. For example, the file portion identifier may lack the TIME_OF_ENTRY value until the file portion identifier is stored in a peer heat table. Thus, in an embodiment, the file portion identifier lacks the TIME_OF_ENTRY value when transfer program 106 of a peer site server 102 sends the file portion identifier to another peer site server 102.

In the depicted embodiment, a file portion identifier comprises the following values corresponding to a file portion residing in one or more extents. FILE_NAME indicates a name of the file of which the file portion is a portion. FILE_ID indicates a file identifier of the peer site server 102 on which the peer heat table is stored, the file identifier identifying the file of which the file portion is a portion. PORTION_OFFSET indicates the offset at which the file portion begins, relative to the beginning of the file. PORTION_LENGTH indicates a length of the file portion. Both PORTION_OFFSET and PORTION_LENGTH may be expressed in bytes. PORTION_HEAT_VALUE indicates a heat value for the file portion, which corresponds to the heat value of an extent in which the file portion is stored on the peer site server 102 to which the peer heat table corresponds. TIME_OF_ENTRY indicates a time at which the file portion identifier was stored in the peer heat table.

In an embodiment, file portion identifiers with a TIME_OF_ENTRY exceeding a predetermined threshold (i.e., of a predetermined age) expire and are removed from the peer heat table. In an embodiment, FILE_ID identifies an inode, wherein an inode is a data structure that contains information about a file. For example, file manager 112 may comprise an inode table comprising an inode for each file stored in tiered storage 110. In various embodiments, the peer heat table may further comprise a file name of the file, a file portion offset, a file portion length, a file portion heat value, and a time of entry.

Figure 6:
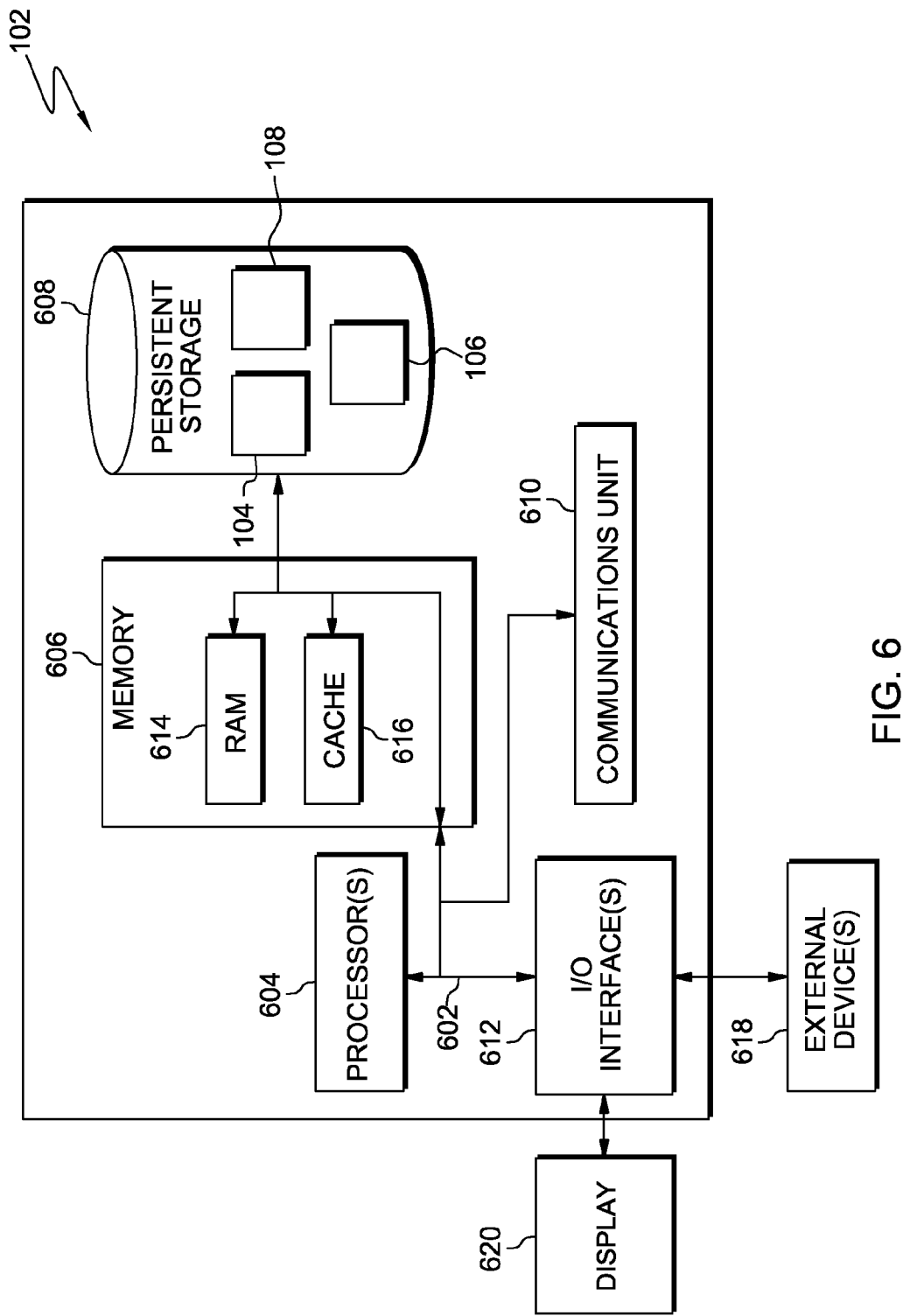
FIG. 6 depicts a block diagram of components of a peer site server, in accordance with an illustrative embodiment of the present invention.

FIG. 6 depicts a block diagram of components of a peer site server, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Peer site server 102 includes communications fabric 602, which provides communications between computer processor(s) 604, memory 606, persistent storage 608, communications unit 610, and I/O interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Peer heat database 104, transfer program 106, and restore program 108 are stored in persistent storage 608 for execution and/or access by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including other peer site servers 102 and client devices 114 and 116. In these examples, communications unit 610 includes one or more network interface cards. Communications unit 610 may provide communications through the use of either or both physical and wireless communications links. Transfer program 106 and restore program 108 may be downloaded to persistent storage 608 through communications unit 610.

I/O interface(s) 612 allows for input and output of data with other devices that may be connected to peer site server 102. For example, I/O interface(s) 612 may provide a connection to external devices 618 such as a keyboard, a keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., transfer program 106 and restore program 108, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for updating access values in a replicated server system, the method comprising:
   a first server system identifying a first storage area of the first server system, the first storage area being associated with a first heat value and storing at least a portion of a file;
   the first server system determining an identifier corresponding to the portion of the file;
   the first server system associating the portion of the file with the first heat value; and
   the first server system sending the identifier corresponding to the portion of the file and the associated heat value to a second server system, wherein the second server system includes a duplicate copy of the portion of the file.

2. The method of claim 1, further comprising:
   the second server system receiving the identifier corresponding to the portion of the file and the associated heat value and subsequently determining that the first server system is unavailable;
   in response, the second server system identifying one or more storage areas of the second server storing the duplicate copy of the portion of the file, based on the received identifier; and
   updating a heat value corresponding to the one or more storage areas of the second server system based on the received heat value associated with the portion of the file.

3. The method of claim 1, further comprising:
   the first server system monitoring workload activity of the first server system and, in response, modifying a first heat map of the first server system to associate the first storage area with the first heat value; and
   the second server system monitoring workload activity of the second server system and, in response, modifying a second heat map of the second server system.

4. The method of claim 3, further comprising:
   the first server system storing primary file data;
   the second server system maintaining cached file data by replicating the primary file data;
   the first server system allocating a portion of the primary file data to a first storage tier of a plurality of storage tiers of the first server system in response to the first heat map; and
   the second server system allocating a portion of the cached file data to a second storage tier of a plurality of storage tiers of the second server system in response to the second heat map.

5. The method of claim 1, wherein the identifier comprises a file name, a file offset, a portion length, and a remote file identifier, wherein the remote file identifier corresponds to the second server system.

6. The method of claim 2, wherein updating the heat value comprises determining a merged heat value in response to a weighting policy, the weighting policy prioritizing the heat value corresponding to the one or more storage areas of the second server system in relation to the received heat value associated with the portion of the file.

7. The method of claim 2, wherein updating the heat value comprises:
   determining an average heat value by averaging the heat value corresponding to the one or more storage areas of the second server system and the received heat value associated with the portion of the file; and
   storing the average heat value as the heat value corresponding to the one or more storage areas of the second server system.

8. The method of claim 1, wherein the first storage area of the first server system is an extent of the first server system.

9. A computer program product for distributed data storage, the computer program product comprising:
   one or more computer-readable storage media and program instructions stored on the one or more computer-readable storage media, the program instructions comprising program instructions to:
      identify a first storage area of a first server system, the first storage area being associated with a first heat value and storing at least a portion of a file;
      determine an identifier corresponding to the portion of the file;
      associate the portion of the file with the first heat value; and
      send the identifier corresponding to the portion of the file and the associated heat value to a second server system, wherein the second server system includes a duplicate copy of the portion of the file.

10. The computer program product of claim 9, wherein the program instructions further comprise program instructions to:
    receive the identifier corresponding to the portion of the file and the associated heat value and subsequently determining that the first server system is unavailable;
    in response, identify one or more storage areas of the second server storing the duplicate copy of the portion of the file, based on the received identifier; and
    update a heat value corresponding to the one or more storage areas of the second server system based on the received heat value associated with the portion of the file.

11. The computer program product of claim 9, wherein the program instructions further comprise program instructions to:
    monitor workload activity of the first server system and, in response, modify a first heat map of the first server system to associate the first storage area with the first heat value; and
    monitor workload activity of the second server system and, in response, modify a second heat map of the second server system.

12. The computer program product of claim 11, wherein the program instructions further comprise program instructions to:

store primary file data;

maintain cached file data by replicating the primary file data;

allocate a portion of the primary file data to a first storage tier of a plurality of storage tiers of the first server system in response to the first heat map; and allocate a portion of the cached file data to a second storage tier of a plurality of storage tiers of the second server system in response to the second heat map.

13. The computer program product of claim 9, wherein the identifier comprises a file name, a file offset, a portion length, and a remote file identifier, wherein the remote file identifier corresponds to the second server system.

14. The computer program product of claim 10, wherein the program instructions to update the heat value comprises program instructions to determine a merged heat value in response to a weighting policy, the weighting policy prioritizing the heat value corresponding to the one or more storage areas of the second server system in relation to the received heat value associated with the portion of the file.

15. A computer system for distributed data storage, the computer system comprising:

one or more computer processors;

one or more computer-readable storage media;

program instructions stored on the computer-readable storage media for execution by at least one of the one or more processors, the program instructions comprising program instructions to:

identify a first storage area of a first server system, the first storage area being associated with a first heat value and storing at least a portion of a file;

determine an identifier corresponding to the portion of the file;

associate the portion of the file with the first heat value; and send the identifier corresponding to the portion of the file and the associated heat value to a second server system, wherein the second server system includes a duplicate copy of the portion of the file.

16. The computer system of claim 15, wherein the program instructions further comprise program instructions to:

receive the identifier corresponding to the portion of the file and the associated heat value and subsequently determining that the first server system is unavailable;

in response, identify one or more storage areas of the second server storing the duplicate copy of the portion of the file, based on the received identifier; and update a heat value corresponding to the one or more storage areas of the second server system based on the received heat value associated with the portion of the file.

17. The computer system of claim 15, wherein the program instructions further comprise program instructions to:

monitor workload activity of the first server system and, in response, modify a first heat map of the first server system to associate the first storage area with the first heat value; and monitor workload activity of the second server system and, in response, modify a second heat map of the second server system.

18. The computer system of claim 17, wherein the program instructions further comprise program instructions to:

store primary file data;

maintain cached file data by replicating the primary file data;

allocate a portion of the primary file data to a first storage tier of a plurality of storage tiers of the first server system in response to the first heat map; and allocate a portion of the cached file data to a second storage tier of a plurality of storage tiers of the second server system in response to the second heat map.

19. The computer system of claim 15, wherein the identifier comprises a file name, a file offset, a portion length, and a remote file identifier, wherein the remote file identifier corresponds to the second server system.

20. The computer system of claim 16, wherein the program instructions to update the heat value comprises program instructions to determine a merged heat value in response to a weighting policy, the weighting policy prioritizing the heat value corresponding to the one or more storage areas of the second server system in relation to the received heat value associated with the portion of the file.

* * * * *